US011457570B2

(12) United States Patent
Grant

(10) Patent No.: US 11,457,570 B2
(45) Date of Patent: Oct. 4, 2022

(54) PLANTER BLOCK

(71) Applicant: David E. Grant, Old Town, ME (US)

(72) Inventor: David E. Grant, Old Town, ME (US)

( * ) Notice: Subject to any disclaimer, the term of this patent is extended or adjusted under 35 U.S.C. 154(b) by 32 days.

(21) Appl. No.: 17/217,108

(22) Filed: Mar. 30, 2021

(65) Prior Publication Data

US 2021/0315167 A1  Oct. 14, 2021

Related U.S. Application Data

(63) Continuation-in-part of application No. 16/847,145, filed on Apr. 13, 2020, now Pat. No. 10,995,491.

(51) Int. Cl.
*A01G 9/02* (2018.01)

(52) U.S. Cl.
CPC .................................. *A01G 9/023* (2013.01)

(58) Field of Classification Search
CPC .......... A01G 9/02; A01G 9/021; A01G 9/022; A01G 9/023; A01G 9/024; A01G 9/025; E04B 2/14; E04B 2002/0256; E04C 1/395
USPC ........................................................ 52/173.1
See application file for complete search history.

(56) References Cited

U.S. PATENT DOCUMENTS

| | | | | |
|---|---|---|---|---|
| 7,818,919 B1 * | 10/2010 | Maxwell-Merrill | ... | A01G 9/025 47/83 |
| 7,886,482 B2 * | 2/2011 | DiMaggio | ............. | A47G 7/041 47/82 |
| 8,683,744 B2 * | 4/2014 | Chang | .................... | A01G 9/027 47/41.01 |
| D742,278 S * | 11/2015 | Wu | .............................. | D11/143 |
| 9,351,448 B2 * | 5/2016 | Mackenzie | ............ | A01G 9/025 |
| 10,294,665 B2 * | 5/2019 | Sadler | ..................... | A01G 9/022 |
| 2001/0052199 A1 * | 12/2001 | Klein | ....................... | A01G 9/02 47/65.5 |
| 2006/0156674 A1 * | 7/2006 | Dean | ....................... | E04C 1/395 52/596 |
| 2010/0192459 A1 * | 8/2010 | Cottier | ..................... | A01G 9/02 47/65.7 |
| 2011/0192081 A1 * | 8/2011 | MacKenzie | ............ | A01G 9/025 47/65.5 |
| 2011/0258925 A1 * | 10/2011 | Baker | .................... | A01G 9/023 47/66.1 |
| 2012/0227320 A1 * | 9/2012 | Dos Santos | .......... | A01G 27/005 47/65.5 |
| 2013/0074406 A1 * | 3/2013 | Allison | .................... | A01G 9/02 47/65.5 |
| 2013/0276369 A1 * | 10/2013 | Hatcher | ................... | A01G 9/02 47/65.6 |
| 2015/0351328 A1 * | 12/2015 | Leigh | ..................... | A01G 9/025 47/83 |
| 2017/0094912 A1 * | 4/2017 | Brooks | .................. | A01G 9/026 |
| 2018/0355611 A1 * | 12/2018 | Sadler | ...................... | A01G 9/00 |
| 2020/0332527 A1 * | 10/2020 | Grant | ....................... | E04B 2/14 |

* cited by examiner

*Primary Examiner* — Brian E Glessner
*Assistant Examiner* — James J Buckle, Jr.
(74) *Attorney, Agent, or Firm* — Anthony D. Pellegrini

(57) ABSTRACT

A block used for constructing a wall, where the block is configured with a front wall angled inward and downward, forming a triangular interior space into which soil can be placed, such that plants placed in the soil will have access to the sun and rain due to the angled front wall of the block placed above it, thereby providing an integrated vegetated wall.

32 Claims, 17 Drawing Sheets

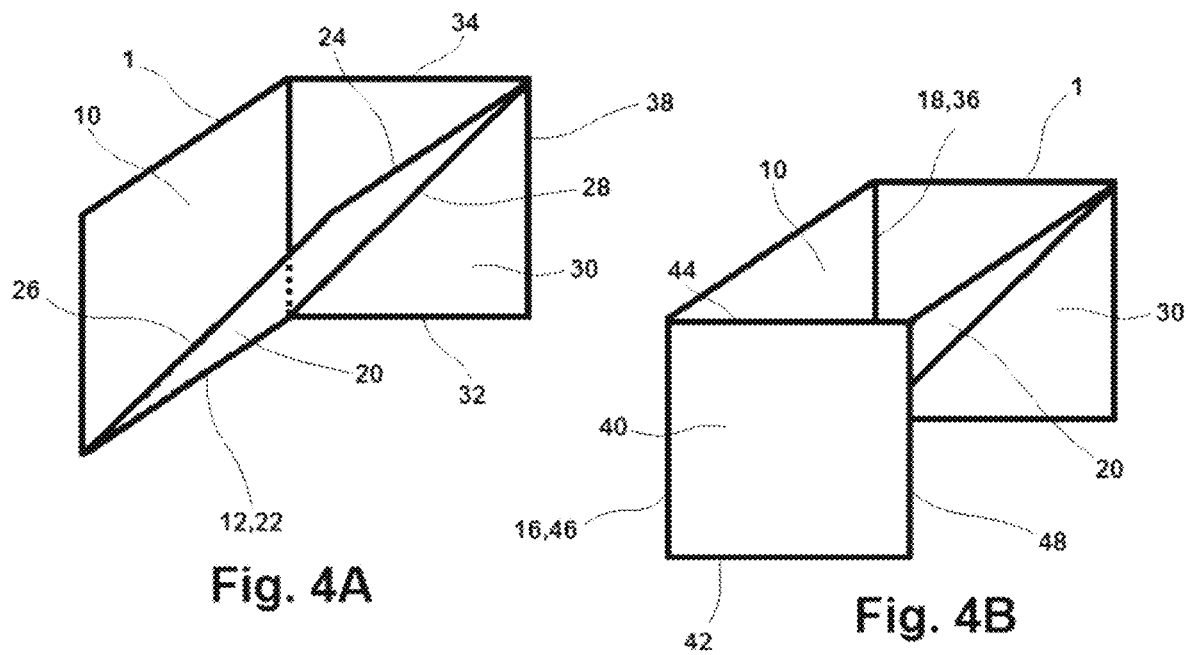
Fig. 4A
Fig. 4B
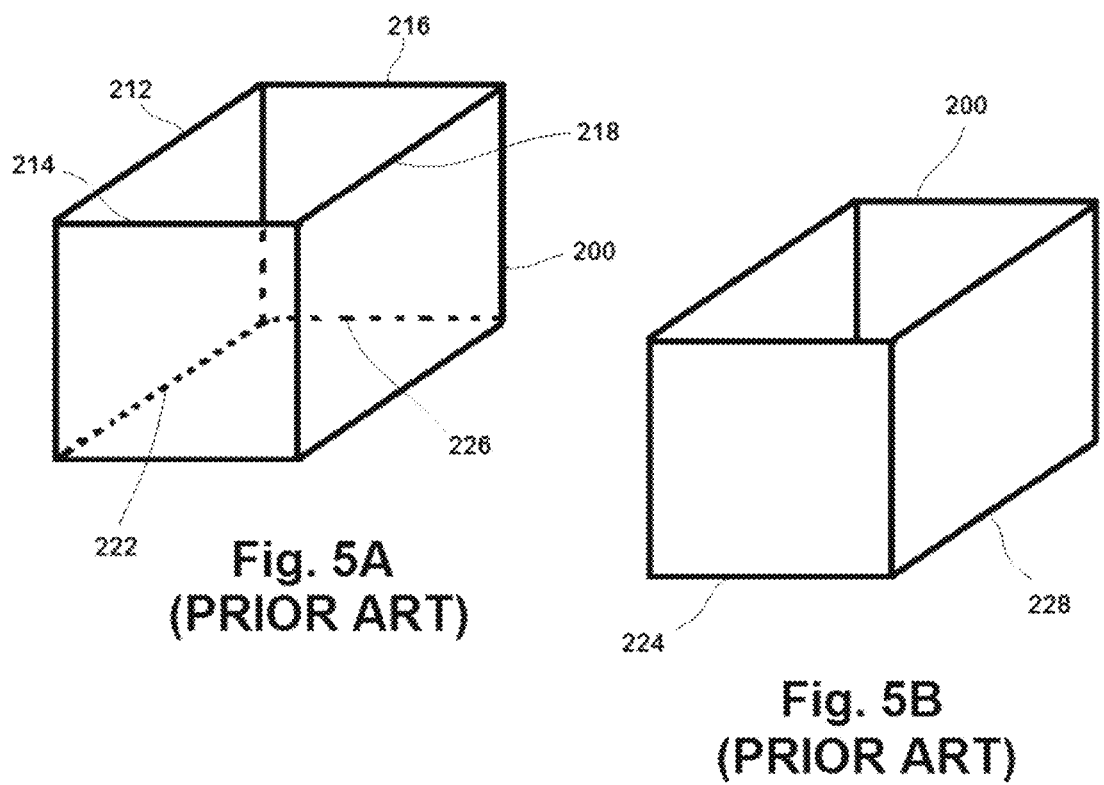
Fig. 5A
(PRIOR ART)
Fig. 5B
(PRIOR ART)

PLANTER BLOCK

CROSS REFERENCE TO RELATED APPLICATIONS

This application claims the benefit of non-provisional application, U.S. Ser. No. 16/847,145, filed Apr. 13, 2020, to provisional application, U.S. Ser. No. 62/839,162, filed Apr. 26, 2019, entitled PLANTER BLOCK, by Grant, David E., and to provisional application, U.S. Ser. No. 62/834,708, filed Apr. 16, 2019, entitled PLANTER BLOCK, by Grant, David E., all of which are hereby incorporated by reference.

BACKGROUND OF THE INVENTION

The present invention relates to building materials in general, and specifically to blocks use to construct exterior walls.

Standard concrete blocks for making exterior walls are well known in the art. They are inexpensive and easy to manufacture, and allow for walls to be constructed quickly. However, standard concrete blocks are not very attractive.

People tend to like to have growing plants and other vegetation on their property, and often like to embellish walls with plants. Traditionally, this was done by placing pots or other planters on the tops of walls or in front of walls. This tends to be less than suitable, however, as pots placed on top of walls may blow off in high winds, or otherwise fall from the wall, while those placed in front of walls impede movement past the wall and may even present a tripping hazard.

A potential solution to these problems is to affix a planter to the outer surface of the wall. However, this solution is less than optimal, as it requires considerable effort to ensure the planter remains attached to the wall. It also does not address the impedance of movement past the wall, as such a planter protrudes from the face of the wall.

Another potential solution is found in U.S. Pat. No. 7,818,919 (Oct. 26, 2010), "Botanically Studded Edifice", in which modified blocks are used to replace selected standard concrete blocks in a wall. These modified blocks have containers which protrude out from the face of the wall, allowing soil to be placed therein. While this approach solves the problem of falling planters, as well as the problem of easily affixing a planter to the wall, it does nothing to alleviate the impedance of movement past the wall.

It is therefore shown that an improved block for building walls is needed, in which the block can be substituted for a standard concrete block and thus be integrated seamlessly into the wall.

It is therefore an object of the present invention to provide a block for constructing a wall which comprises an integrated planter.

It is a further object of the present invention to provide a block for constructing a wall which comprises an integrated planter which does not protrude from the face of the wall.

It is yet a further object of the present invention to provide a block for constructing a wall which is sized and dimensioned the same as a standard concrete block.

Other objects of the present invention will be readily apparent from the description that follows.

SUMMARY

The present invention is an improved concrete block used for constructing a wall. The improvement over the standard concrete block is a front wall that angles inward and downward, forming a triangular interior space as well as a forward space. The back and side walls remain configured substantially the same as a standard concrete block. This allows the block of the present invention to be used together with standard concrete blocks to create a wall interspersed with the blocks of the present invention, in any pattern desired. For example, the blocks may be stacked either staggered as in conventional block wall construction, or vertically with one directly on top of the next. Moreover, standard walls are limited to straight walls and ninety degree corners. The improved block of the present invention can readily be used to form rounded corners on curved vertical structures, with plantings located on the inside of the curve or the outside of the curve or both. This is an improvement over the prior art, which requires the blocks to be staggered to allow space for the plant structure because they extend beyond the standard wall.

This design therefore provides two usable spaces: the interior space between the back and front walls provides a container for soil and plant roots; while the space in front of the front wall provides an area for the above ground plant structure (stems, leaves, vines, etc.) Both of these spaces are contained within the footprint of the block. Because the front wall of the block is angled inward and downward, a block stacked on top of another block does not obscure the top opening of the lower block. Thus, soil can be placed into the lower block and plants can be planted in the soil. They will have access to the sun and rain due to the angled front wall of the block placed above it. However, because the front wall of the block is angled inward, the resulting wall does not have protrusions extending out from the face of the wall. This gives a clean finish as well as increasing safety, since there is nothing to impede the movement of persons or objects close to the wall. An additional benefit of the present design is to provide a continuous plant presence on the front of walls, thereby allowing for the organic absorption of solar energy and productive bio usage of architectural space.

It is to be understood that the foregoing and following description of the invention is intended to be illustrative and exemplary rather than restrictive of the invention as claimed. These and other aspects, advantages, and features of the invention will become apparent to those skilled in the art after review of the entire specification, accompanying figures, and claims incorporated herein.

DESCRIPTION OF THE DRAWINGS

FIG. 4A is a perspective side view of an alternative embodiment of the block of the present invention having only one side wall, with hidden edges shown in ghost line.

FIG. 4B is a perspective side view of the embodiment of the block shown in FIG. 1A.

FIG. 5A is a perspective side view of a prior art standard concrete block, with hidden edges shown in ghost line.

FIG. 5B is a perspective side view of the prior art standard concrete block shown in FIG. 5A.

DETAILED DESCRIPTION OF THE INVENTION

Figure 1A:
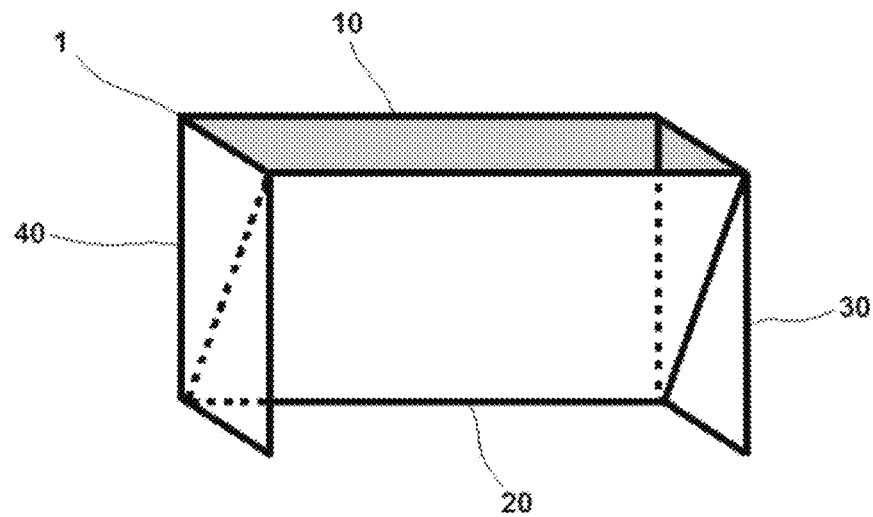
FIG. 1A is a perspective front view of one embodiment of the block of the present invention, with hidden edges shown in ghost line.
Figure 1B:
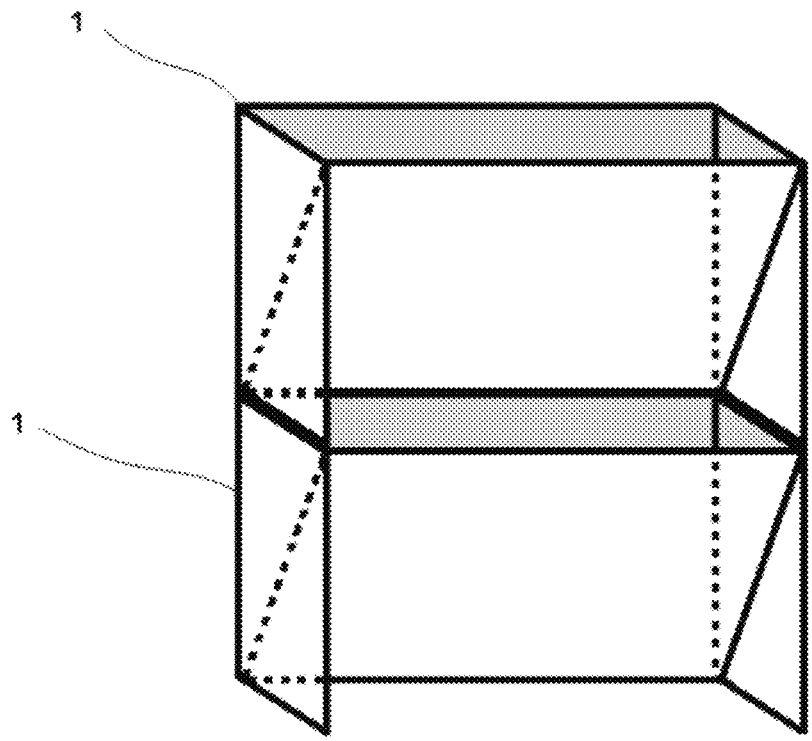
FIG. 1B is a perspective front view of the embodiment of the block shown in FIG. 1A in a stacked configuration, one block upon the other, with hidden edges shown in ghost line.

The present invention is a block 1 used for constructing a wall. It is intended to replace one or more standard concrete blocks 200 used for constructing walls, as is well known in the art. The block 1 of the present invention comprises a back wall 10, a front wall 20, a first side wall 30, and a second side wall 40. See FIG. 1A. Alternatively, the block 1 may comprise only a single side wall. See FIG. 4A. The back wall 10 of the block 1 is substantially planar and substantially rectangular. It has a bottom edge 12, a top edge 14, a first side edge 16, and a second side edge 18. The front wall 20 of the block 1 is substantially planar and substantially rectangular. It has a bottom edge 22, a top edge 24, a first side edge 26, and a second side edge 28. The first side wall 30 of the block 1 is substantially planar and substantially rectangular. It has a bottom edge 32, a top edge 34, a back edge 36, and a front edge 38. The second side wall 40 of the block 1, if present, is substantially planar and substantially rectangular. It has a bottom edge 42, a top edge 44, a back edge 46, and a front edge 48, and is sized and dimensioned substantially the same as the first side wall 30 of the block 1. See FIGS. 1A and 4B.

In one embodiment of the present invention, the walls comprising the block 1 are oriented with respect to each other as follows: the back wall 10 is oriented substantially vertically, the first side wall 30 is oriented substantially vertically and substantially perpendicular to the back wall 10, the second side wall 40, if present, is oriented substantially vertically and substantially perpendicular to the back wall 10 and substantially parallel to the first side wall 30, and the front wall 20 is oriented at an angle to the vertical, where the top edge 24 of the front wall 20 is substantially parallel to the top edge 14 of the back wall 10 and spaced apart from the top edge 14 of the back wall 10, the bottom edge 22 of the front wall 20 is located adjacent to the bottom edge 12 of the back wall 10, and the front wall 20 is oriented substantially perpendicular to the first side wall 30 and substantially perpendicular to the second side wall 40, if present.

The back edge 36 of the first side wall 30 is located adjacent to the first side edge 16 of the back wall 10 and fixedly attached thereto. The back edge 46 of the second side wall 40, if present, is located adjacent to the second side edge 18 of the back wall 10 and fixedly attached thereto. The first side edge 26 of the front wall 20 is located adjacent to the first side wall 30. If the second side wall 40 is present, the second side edge 28 of the front wall 20 is located adjacent to the second side wall 40. The bottom edge 22 of the front wall 20 is located adjacent to the bottom edge 12 of the back wall 10.

Figure 2A:
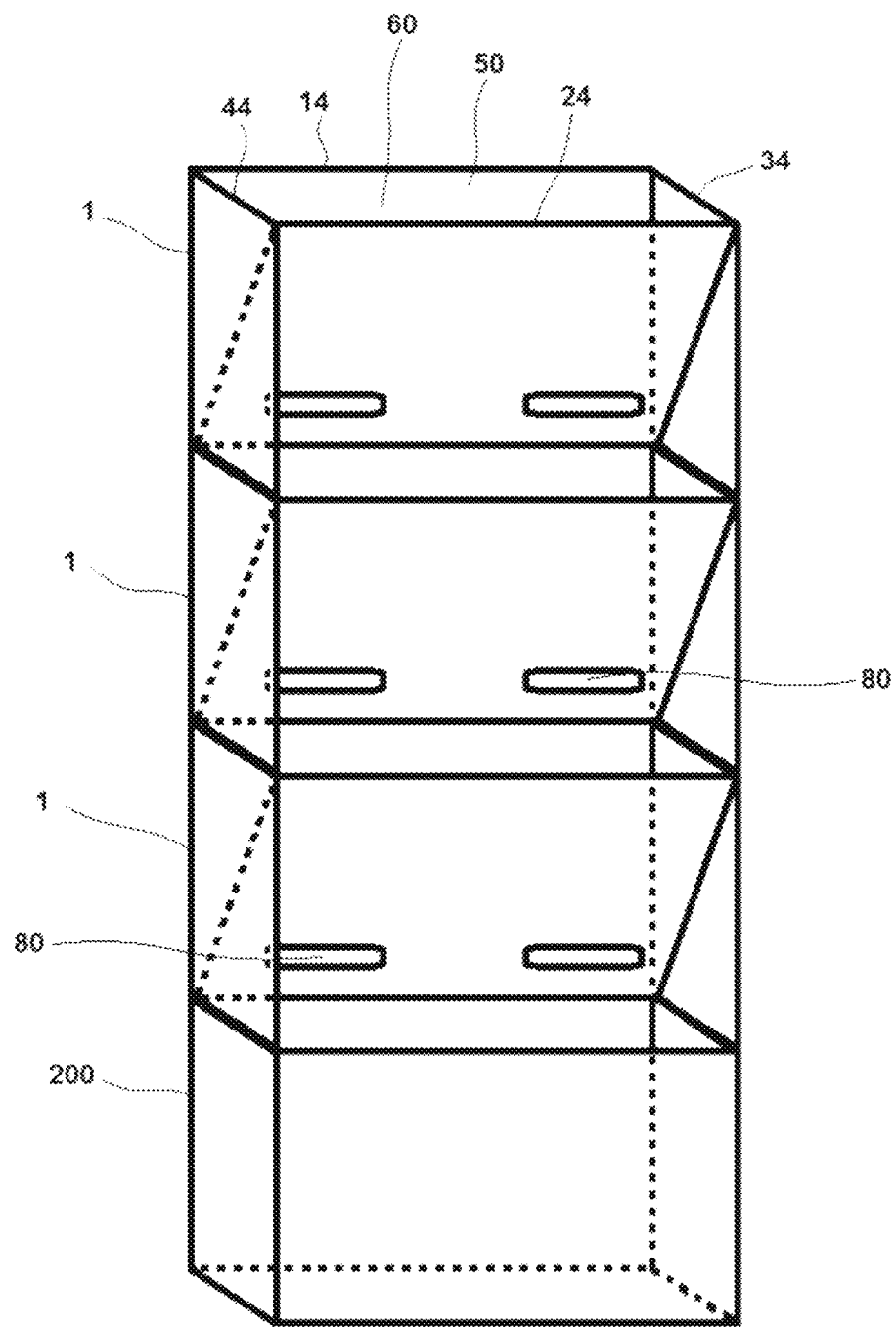
FIG. 2A is a perspective front view of the embodiment of the block shown in FIGS. 1A and 1B in a stacked configuration, with three such blocks stacked upon each other, and the lowest block stacked upon a prior art standard concrete block, with hidden edges shown in ghost line.
Figure 3:
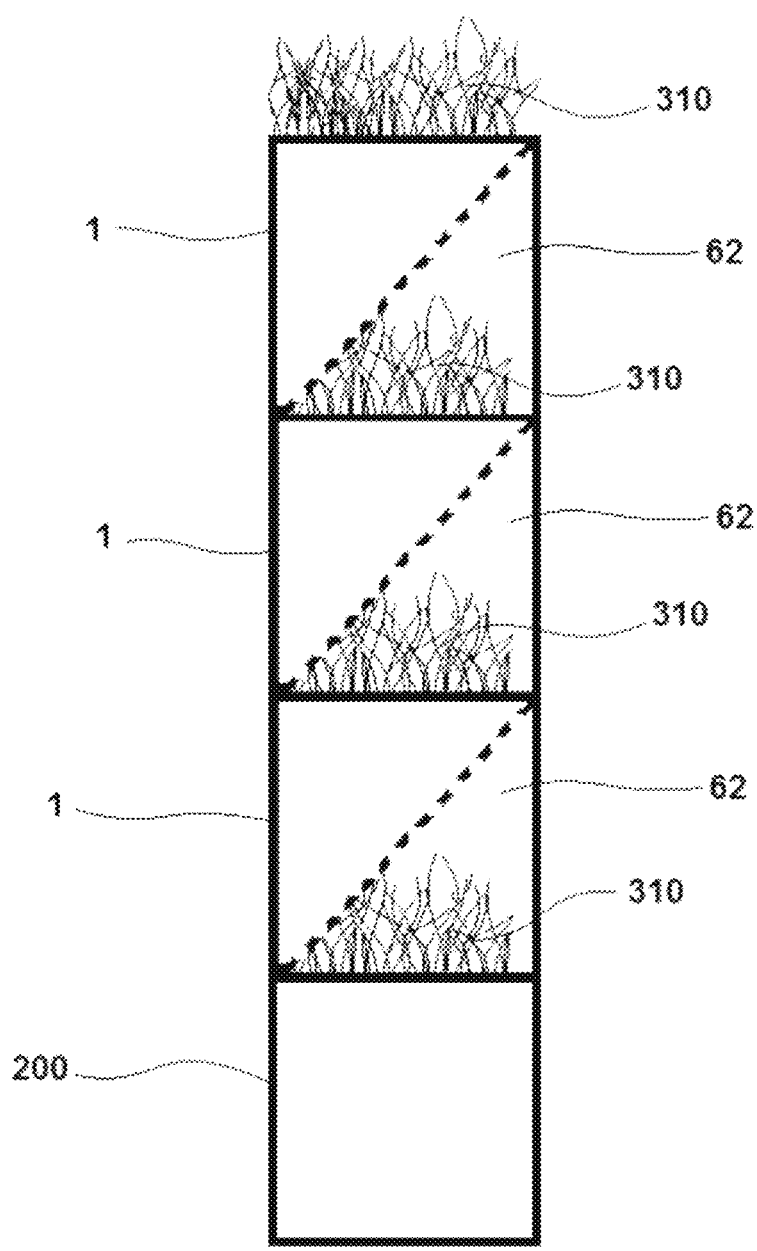
FIG. 3 is a plan side view of the embodiment of the block shown in FIG. 2B in a stacked configuration, with three such blocks stacked upon each other, and the lowest block stacked upon a prior art standard concrete block, with vegetation depicted as emerging from the interior spaces of the blocks into the forward spaces of the blocks placed above them.

Configured as described, the back wall 10, front wall 20, first side wall 30, and second side wall 40 form a four sided container with an open top 50, an interior space 60, and a forward space 62. See FIGS. 2A and 3. Alternatively, the back wall 10, front wall 20, and the sole side wall 40 form a three sided container with an open top 50 and an open side, an interior space 60, and a forward space 62. See FIG. 4A. The alternative three sided container represents a simpler, lighter version of the block 1, yet it possesses the same building characteristics because the side wall of an adjacent block 1 acts as the missing side wall of the instant block 1.

The interior space 60 is located between the back wall 10 and the front wall 20 and between the first side wall 30 and the second side wall 40 (or, where there is no second side wall 40, between the back wall 10 and the front wall 20). The forward space 62 is located between the first side wall 30 and the second side wall 40 and on the opposite side of the front wall 20 from the interior space 60 (or, where there is no second side wall 40, on the opposite side of the front wall 20 from the interior space 60). The block 1 has a top perimeter formed by the top edges of the back wall 10, front wall 20, first side wall 30, and second side wall 40 (or, if there is no second side wall 40, by the top edges of the back wall 10, front wall 20, and first side wall 30), and a footprint parallel to and vertically aligned with the top perimeter.

The back wall 10, first side wall 30, and second side wall 40 provide a base for the block 1 having three sides. The fourth side of the footprint of the block 1 is left opened. See FIG. 1A. Alternatively, the back wall 10 and first side wall 30 provide a base for the block 1 having two sides; the third and fourth sides of the footprint of the block 1 are left opened. See FIG. 4A.

As described, the block 1 of the present invention differs from a standard concrete block 200 in that the front wall 20 of the block 1 of the present invention is angled inwardly from its top edge 24 to its bottom edge 22. See FIGS. 1A and 4A. The block 1 also has no floor, since the front wall 20 meets the back wall 10 at their respective the bottom edges 12,22, forming a triangular cross section. In a variant of this design, the bottom edge 22 of the front wall 20 is slightly spaced apart from the bottom edge 12 of the back wall 10, leaving an approximately one-inch gap. This small gap allows roots from vegetation planted in the block 1 to extend downward into the block 1 located beneath (or into the ground, as the case may be), without causing substantial loss of soil therethrough.

A standard concrete block 200, on the other hand, has a front wall which is sized and dimensioned substantially the same as the back wall and is oriented substantially vertical and parallel to the back wall. The standard concrete block 200 has a top perimeter formed by the standard concrete block's 200 back top edge 212, first side top edge 214, second side top edge 216, and front top edge 218. The standard concrete block 200 has a footprint formed by the standard concrete block's 200 back bottom edge 222, first side bottom edge 224, second side bottom edge 226, and front bottom edge 228. See FIGS. 5A and 5B.

Figure 2B:
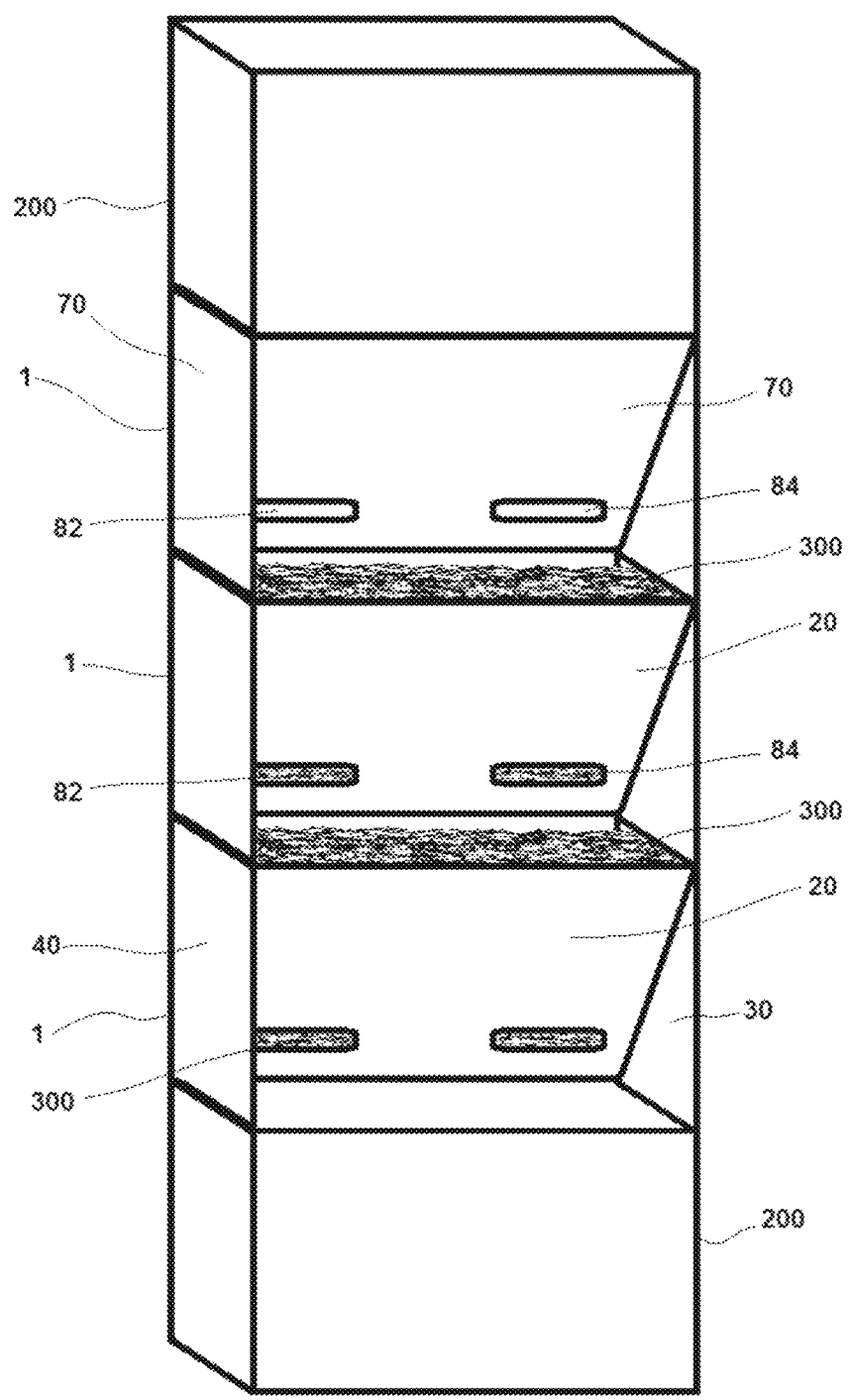
FIG. 2B is a perspective front view of the embodiment of the block shown in FIG. 2A in a stacked configuration, with three such blocks stacked upon each other, and the lowest block stacked upon a prior art standard concrete block and a second standard concrete block stacked upon the topmost block of the present invention, with dirt depicted within the interior spaces of two of the blocks.

In the preferred embodiment, the block 1 of the present invention's top perimeter is the same as the top perimeter of the standard concrete block 200, and the block's 1 footprint is the same as the footprint of the standard concrete block 200. As such, the block 1 of the present invention may be stacked onto a standard concrete block 200, and a standard concrete block 200 may be stacked onto a block 1 of the present invention. See FIGS. 2A, 2B, and 3. A block 1 of the present invention can also be stacked onto another block 1 of the present invention. See FIGS. 1B, 2A, 2B, and 3. Thus, the block 1 of the present invention can be used together with standard concrete blocks 200 to construct a wall. A wall so constructed will have a flush front, with no protuberances extending from its front.

The four sided container of the block 1, having an open top 50 and a closed (or partially closed, as described above) bottom, is suitable for containing items. In the preferred embodiment, the block 1 may contain soil 300 within its interior space 60, in which plants 310 may be grown. See FIGS. 2B and 3. When multiple blocks 1 are stacked, with the footprint of the upper block 1 aligned with the top perimeter of the lower block 1, the angled front wall 20 of the upper block 1 will reveal the open top 50 of the lower block 1. Moreover, the forward space 62 of the upper block 1 provides space for the vegetation planted in the interior space 60 of the lower block 1 to grow. Thus, multiple blocks 1 of the present invention built into a wall will provide integrated planters in the front of the wall. See FIG. 3. The configuration of the front walls 20 of the blocks 1 ensures that the front of the wall remains flush and without protuberances, while at the same time exposing the plants 310 to sunlight and rain. See FIG. 3. Moreover, because standard concrete blocks 200 typically have apertures formed through their tops and floors, these apertures can serve as cavities to hold soil 300, so that a block 1 of the present invention stacked on top of a standard concrete block 200 will allow plants 310 to grow from the soil-filled cavities of the underlying standard concrete block 200. See FIG. 3. Similarly, a three sided container (where the block 1 has no second side wall 40) serves the same function as the four sided container when a second block 1 is placed adjacent thereto, whereby the first side wall 1 of the second block 1 acts also as the second side wall 40 of the first block 1.

In one embodiment, the block 1 of the present invention has a width substantially equal to its height and substantially equal to its depth. This creates a "half block", a block 1 that is substantially configured as a cube. In one configuration the width of the block 1 is eight inches, the height of the block 1 is eight inches, the depth of the block 1 is eight inches, the top perimeter of the block 1 is 32 inches, and the footprint of the block 1 is 32 inches. In another embodiment, the block 1 of the present invention has a width substantially equal to twice its height and depth. In the most preferred embodiment, the width of the block 1 is sixteen inches, the height of the block 1 is eight inches, the depth of the block 1 is eight inches, the top perimeter of the block 1 is 48 inches, and the footprint of the block 1 is 48 inches. This corresponds to the most common dimension of a standard concrete block 200. Other dimensions are also contemplated, corresponding to other standard concrete block 200 sizes, as well as custom dimensions.

In another embodiment of the block 1 of the present invention, the front wall 20 comprises one or more apertures 80. Each said aperture 80 passing completely through the front wall 20, allowing access from the exterior of the block 1 to the interior space 60 of the block 1. In a preferred embodiment, the front wall 20 of the block 1 comprises a first aperture 82 and a second aperture 84. The first aperture 82 is located proximate to the bottom edge 22 of the front wall 20, and midway between the center of the front wall 20 and the first side edge 26 of the front wall 20. The second aperture 84 is located proximate to the bottom edge 22 of the front wall 20, and midway between the center of the front wall 20 and the second side edge 28 of the front wall 20. See FIGS. 2A and 2B. These apertures provide drainage when the block 1 is used as a planter.

Figure 8:
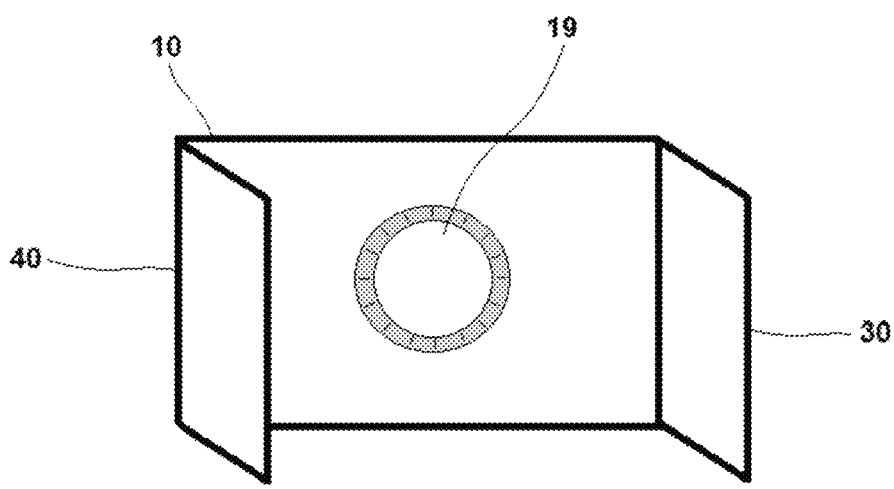
FIG. 8 is a perspective view of an embodiment of the block having a knock out portion of the back wall (the front wall is not show so as to not obscure the back wall).

In yet another embodiment, a portion the back wall 10 may be comprised of a knock out portion 19. See FIG. 8. The knock out portion 19 has a thickness substantially less than the thickness of the remainder of the back wall 10, such that if a sufficient force is applied to the knock out portion 19 it will break apart from the back wall 10, leaving an aperture through the back wall 10 in the location of the knockout portion 19. This aperture provides access to the interior of the block 1, as well as drainage, access for roots, etc. The knock out portion 19 may be of any suitable shape, though the preferred shape is circular.

In yet another embodiment, a portion the front wall 20 closest to its bottom edge 22 curves towards the back wall 10 as the front wall's 20 bottom edge 22 meets the bottom edge 12 of the back wall 10 of the block 1.

While the block 1 can be constructed of any durable, rigid material, such as glass, porcelain, fiberglass, injection molded plastic, metal, composites, and the like, preferably it is made of concrete. It moreover can be cast as a monolithic unit. When the block 1 is made of concrete, one or more of the back wall 10, front wall 20, first side wall 30, and second side wall 40 of the block 1, if present, may contain one or more reinforcement members embedded therein. These reinforcement members may be rebar. Alternately, the reinforcement member may be constructed out of multiple strands of fiberglass. Other materials, such as Kevlar, plastics, metal, etc., may also be used as reinforcement members. This provides strength and rigidity without being susceptible to corrosion. The material making up the block 1 may be colored, giving the block an aesthetic look. Alternatively, only the outer surface 70 of the block 1 may be colored. This could be accomplished by applying paint to the outer surface 70 of the block 1.

Figure 6A:
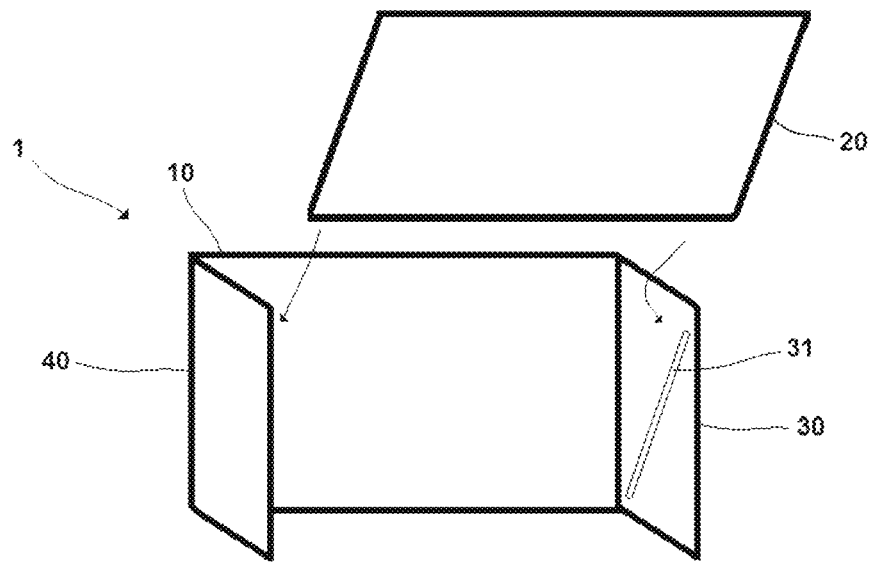
FIG. 6A is a perspective side view of another embodiment of the block of the present invention, whereby the first and second side walls contain an inner raised ridge onto which the front wall is placed.
Figure 6B:
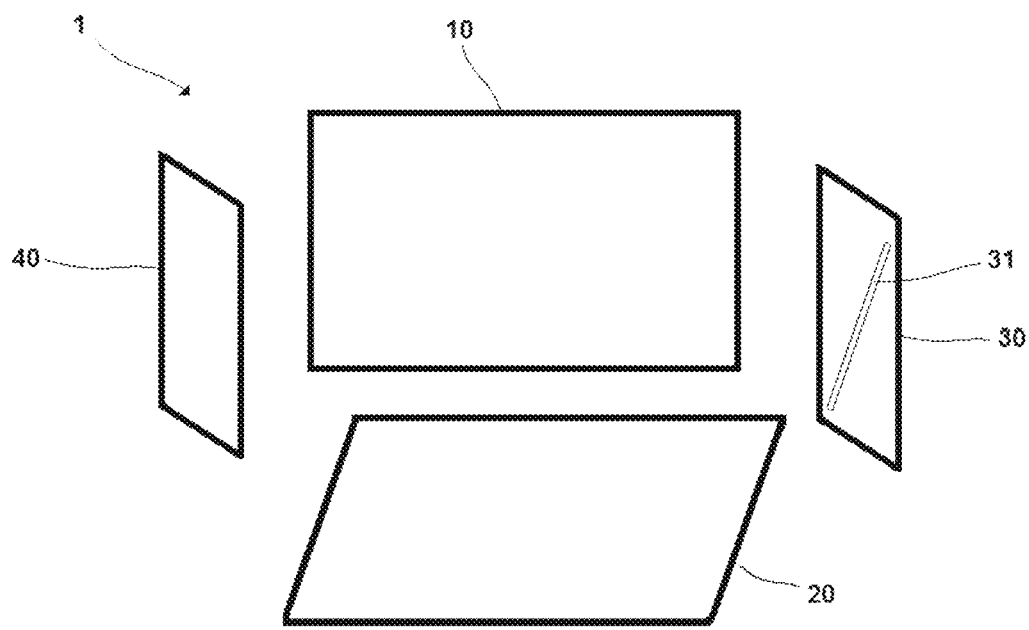
FIG. 6B is a perspective exploded view of the block shown in FIG. 6A.
Figure 6C:
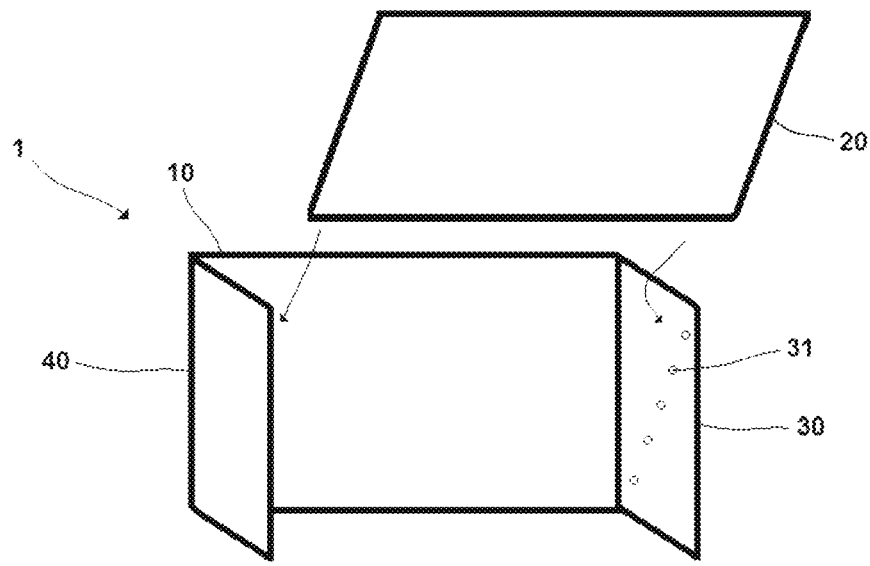
FIG. 6C is a perspective side view of yet another embodiment of the block of the present invention, whereby the first and second side walls contain a series of inner pegs onto which the front wall is placed.
Figure 6D:
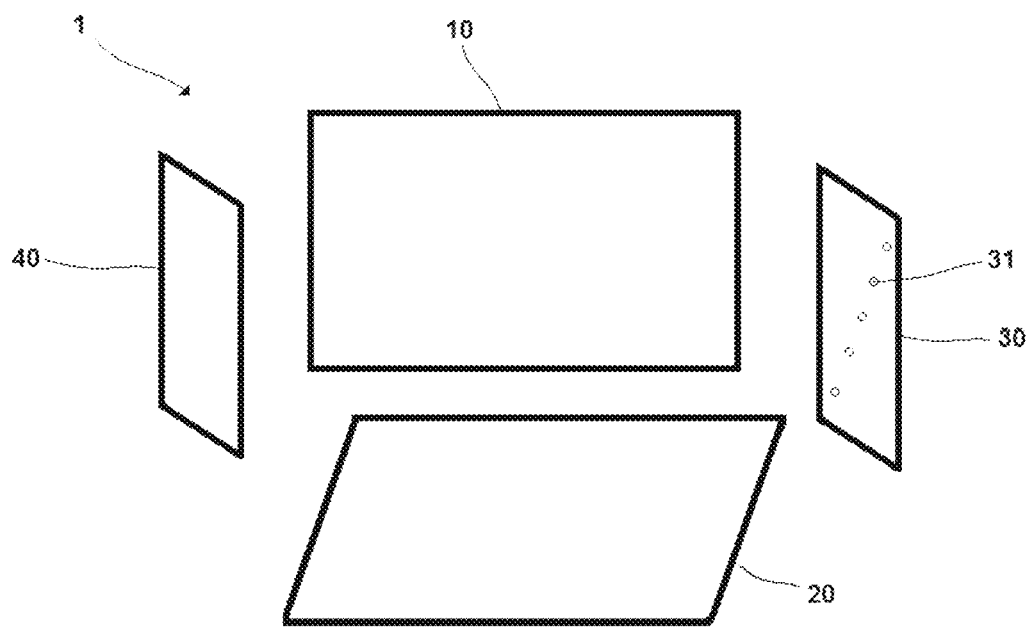
FIG. 6D is a perspective exploded view of the block shown in FIG. 6C.

In an alternative embodiment, the back wall 10, the first side wall 30, and the second side wall 40 of the block 1 may be cast as a monolithic unit, with the front wall 20 being a separate element. In this embodiment, the first side wall 30 has a diagonal inner protuberance 31 located on its inner surface, said protuberance 31 sized to accommodate the first side edge 26 of the front wall 20 thereupon. Similarly, the second side wall 40 has a diagonal inner protuberance located on its inner surface, said protuberance oriented parallel to the protuberance 31 of the first side wall 30 and sized to accommodate the second side edge 28 of the front wall 20 thereupon. In one embodiment the diagonal inner protuberance for each wall 30,40 is a continuous raised ridge having a substantially uniform height. See FIGS. 6A and 6B. In another embodiment the diagonal inner protuberance for each wall 30,40 is series of raised ridges, each ridge having substantially the same height as each other ridge, whereby the ridges are arranged linearly. In yet another embodiment the diagonal inner protuberance for each wall 30,40 is a plurality of pegs, each peg having substantially the same height as each other peg, whereby the pegs are arranged linearly. See FIGS. 6C and 6D. The completed block 1 is formed by placing the front wall 20 onto the diagonal inner protuberances of the first and second side walls 30,40. In this embodiment the front wall 20 may be made of a different material than the other walls.

Figure 7:
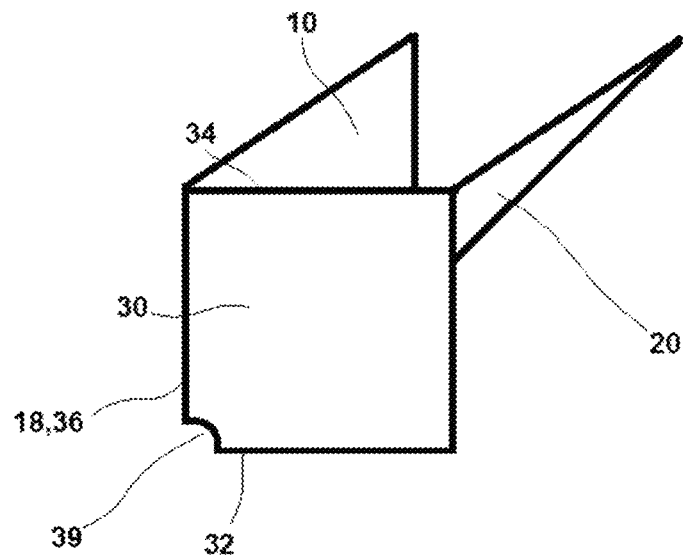
FIG. 7 is a perspective view of an embodiment of the block having a drainage aperture.

In yet another embodiment of the block 1, the first side wall 30 has a first diagonal protuberance located on its inner surface and a second diagonal protuberance located on its outer surface, said first protuberance sized to accommodate the first side edge 26 of the front wall 20 thereupon and said second diagonal protuberance oriented parallel to and aligned with the first diagonal protuberance and sized to accommodate the second side edge 28 of the front wall 20 thereupon. The protuberances may be continuous raised ridges, the discontinuous linearly aligned raised ridges, or the linearly aligned pegs as described above. In this embodiment the block 1 may have no second side wall 40. In this three-sided configuration, two blocks 1 are placed side by side, and the front wall 20 is placed onto the second diagonal protuberance of the first side wall 30 of the first block and onto the first diagonal protuberance of the first side wall 30 of the second block 1. In another modification of this three-sided configuration, the second side edge 18 of the back wall 10 is beveled, so that adjacent blocks 1 can be placed next to each other at an angle to create curved walls. For example, the beveled blocks 1 can be used to create a serpentine wall for use in an outdoor dining setting, creating private dining nooks within each bend of the wall. In yet another modification of this three-sided configuration, the first side wall 30 has an aperture 39 formed therethrough, said aperture 39 located proximate to the bottom edge 32 of the first side wall 30 and proximate to the back edge 36 of the first side wall 30. See FIG. 7. This drainage aperture 39 allows for fluids to pass into and out of the interior portion of the block 1.

Figure 9:
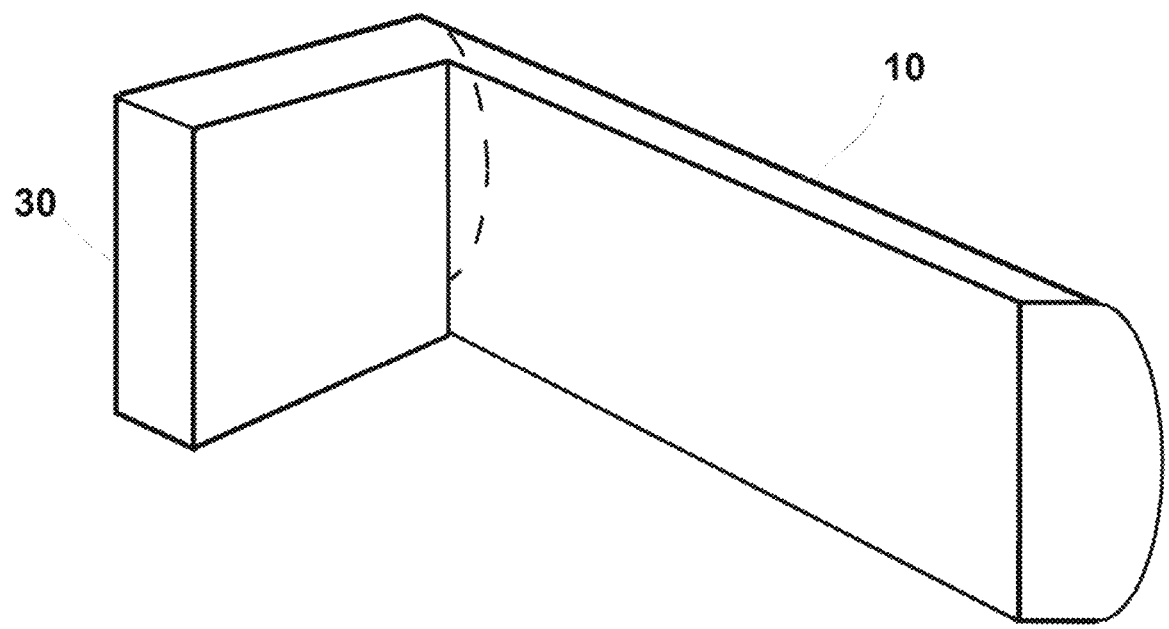
FIG. 9 is a perspective view of yet another embodiment of the block having a vertically convex back wall. Hidden edges are shown in ghost line.
Figure 10:
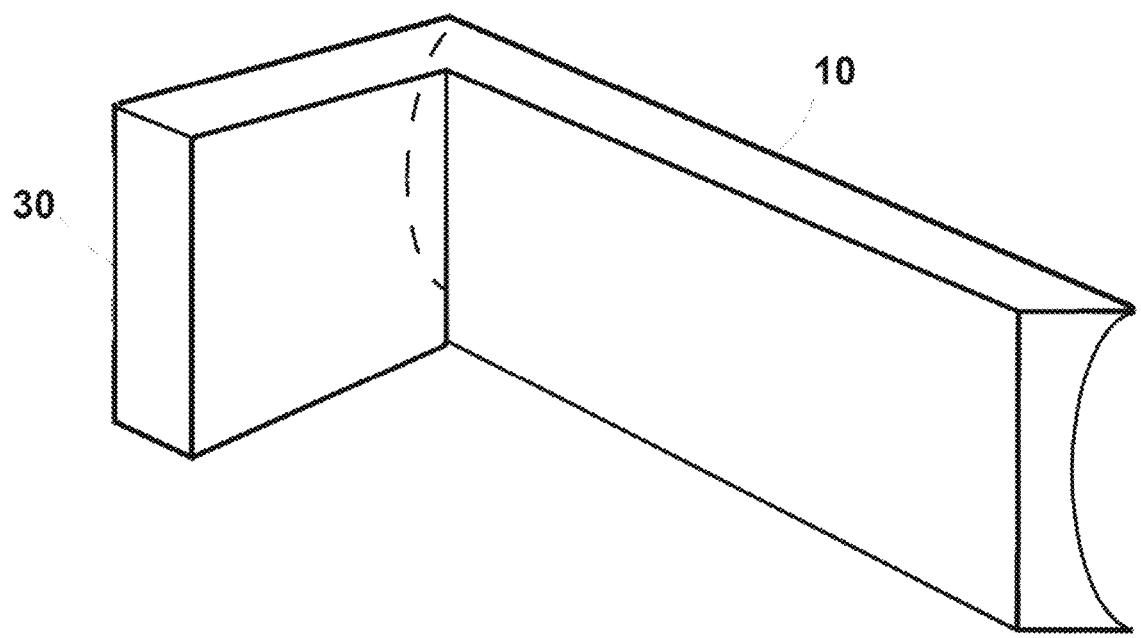
FIG. 10 is a perspective view of yet another embodiment of the block having a vertically concave back wall. Hidden edges are shown in ghost line.
Figure 11:
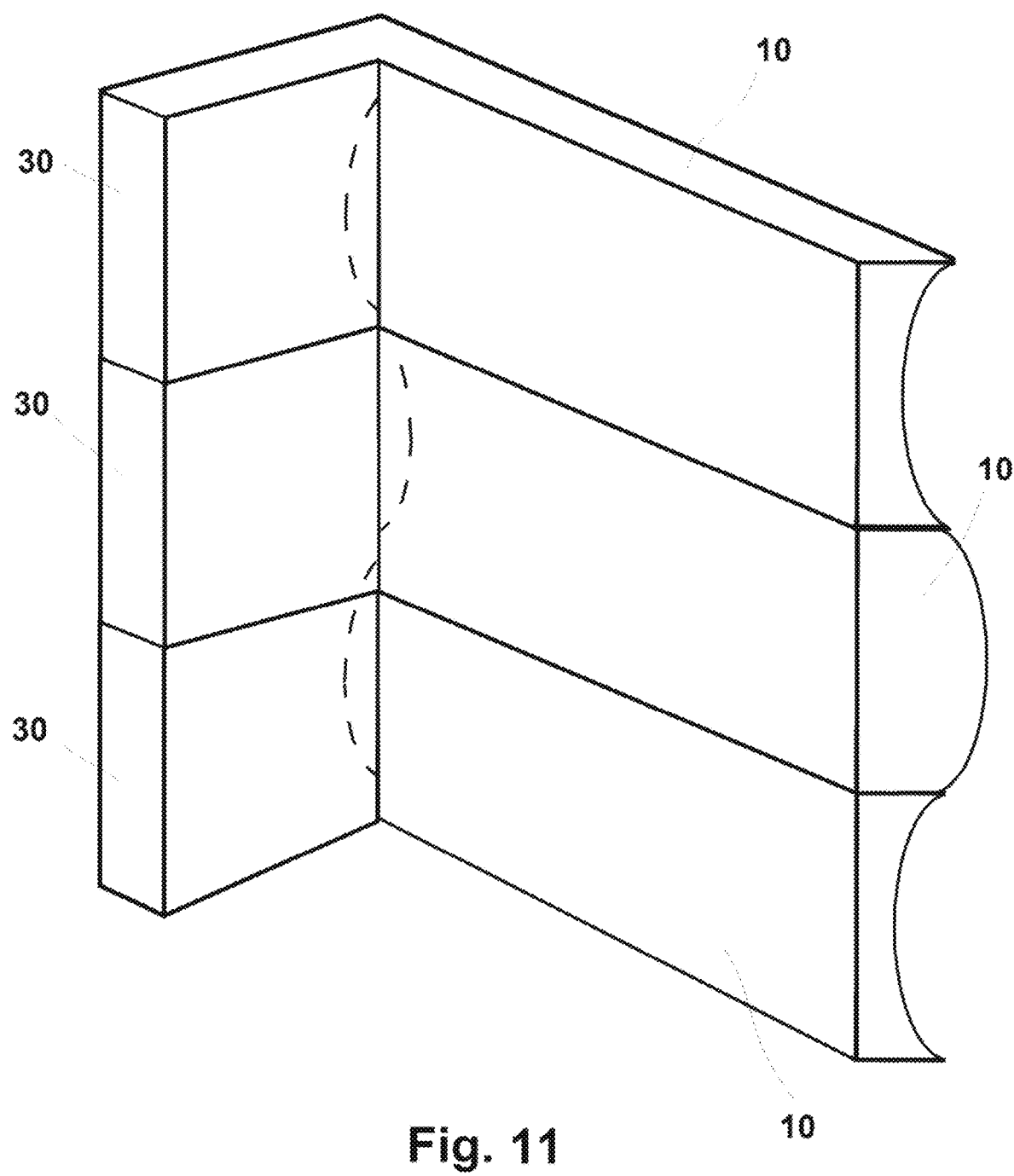
FIG. 11 is a perspective view of a wall created from alternating the blocks depicted in FIGS. 9 and 10. Hidden edges are shown in ghost line.

In yet another embodiment of the block 1, the outer surface of the back wall 10 may be vertically convex. See FIG. 9. In yet another embodiment of the block 1, the outer surface of the back wall 10 may be vertically concave. See FIG. 10. These alternate embodiments permit the blocks 1 to be used to create varying aesthetic designs. For example, the blocks 1 having a vertically convex back wall 10 may be stacked onto blocks 1 having a vertically concave back wall 10 in an alternating pattern, thereby producing a wall with an undulating rear surface. See FIG. 11.

Figure 12:
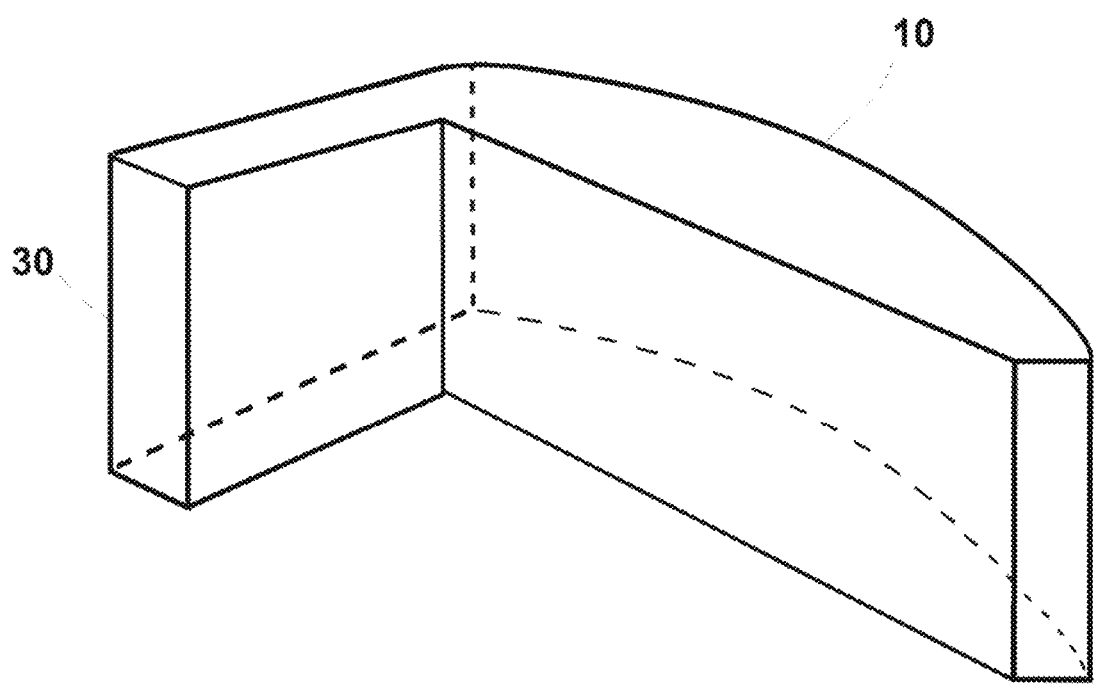
FIG. 12 is a perspective view of yet another embodiment of the block having a horizontally convex back wall. Hidden edges are shown in ghost line.
Figure 13:
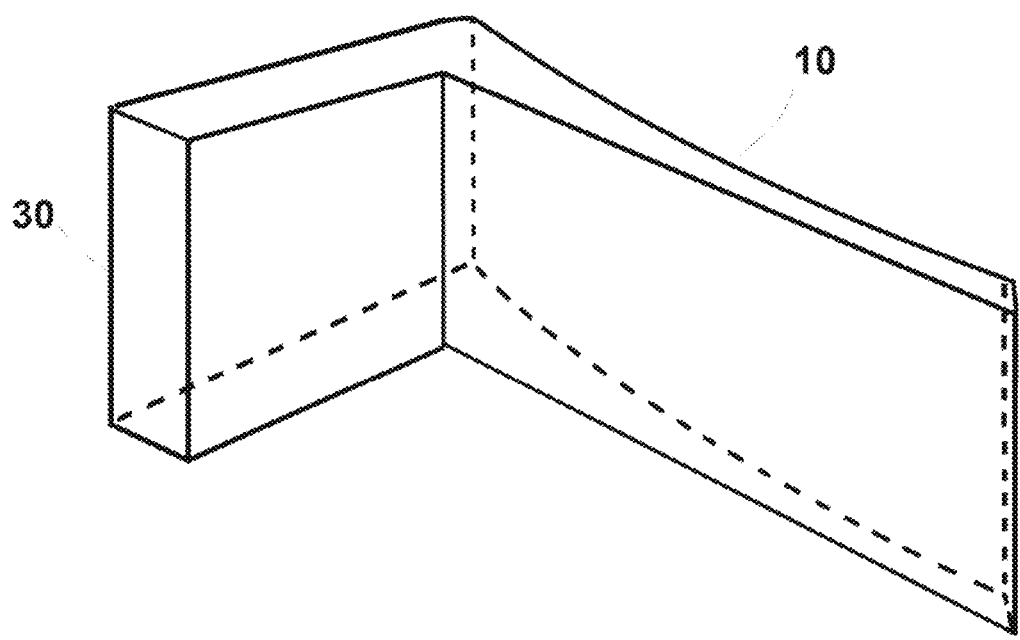
FIG. 13 is a perspective view of yet another embodiment of the block having a horizontally concave back wall. Hidden edges are shown in ghost line.
Figure 14:
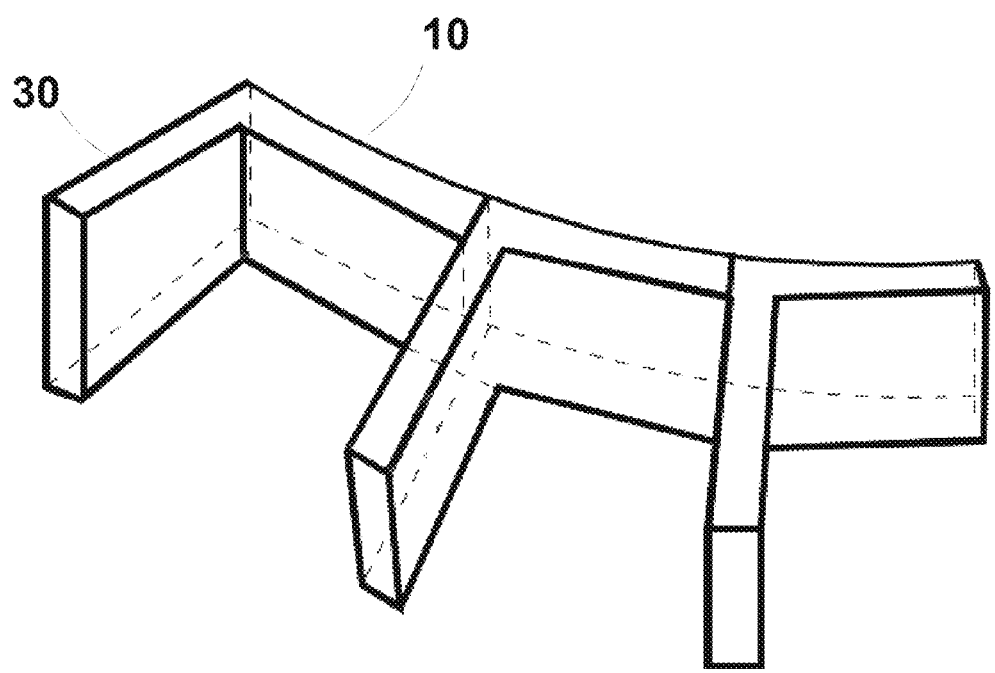
FIG. 14 is a perspective view of a wall created by placing blocks depicted in FIG. 13 adjacent to each other. Hidden edges are shown in ghost line.

In yet another embodiment of the block 1, the outer surface of the back wall 10 may be horizontally convex. See FIG. 12. In yet another embodiment of the block 1, the outer surface of the back wall 10 may be horizontally concave. See FIG. 13. These alternate embodiments permit the blocks 1 to be used to create varying aesthetic designs. For example, blocks 1 having a horizontally concave back wall 10 may be placed adjacent to each other, thereby producing a curved wall presenting as convex front with plantings. See FIG. 14.

Figure 15:
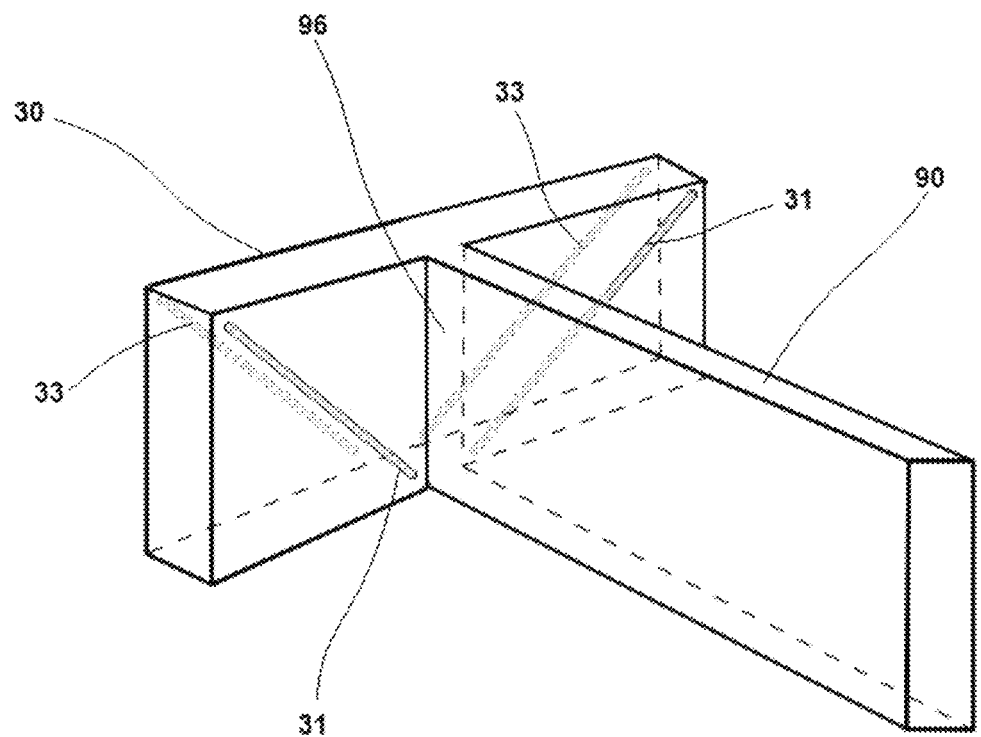
FIG. 15 is a perspective view of yet another embodiment of the block having a center wall adjacent to the first side wall, forming a "T" configuration. Hidden edges are shown in ghost line.

In yet another embodiment of the block 1, the block 1 comprises a center wall 90, a front wall 20, and a first side wall 30. The front wall 20 and first side wall 30 are configured as described above, while the center wall 90 is substantially planar and substantially rectangular, having a bottom edge, a top edge, a first side edge 96, and a second side edge. The first side wall 30 further has a central portion located midway between its front edge and its back edge. The center wall 90 is located adjacent to the first side wall 30, with the first side edge 96 of the central wall 90 fixedly attached to the central portion of the first side wall 30. The first side wall 30 is oriented substantially vertically and substantially perpendicular to the center wall 90. See FIG. 15. So configured, the first side wall 30 and the center wall 90 form a "T" shape when viewed from above.

In a first variant of this embodiment of the block 1, the first side wall 30 further comprises a diagonal inner protuberance 31 located on its inner surface between its central portion and its front edge. The diagonal inner protuberance 31 is sized to accommodate the first side edge of the front wall 20 thereupon, as described above. The diagonal inner protuberance 31 may be configured as described above.

In another variant of this embodiment of the block 1, the first side wall 30 of the block 1 further comprises a diagonal outer protuberance 33. The diagonal outer protuberance 33 is located on the outer surface of the first side wall 30 between its central portion and its front edge. See FIG. 15. The diagonal outer protuberance 33 is sized to accommodate the second side edge of the front wall 20 thereupon. The diagonal outer protuberance 33 may be configured in the same manner as the diagonal inner protuberance 31.

Figure 16A:
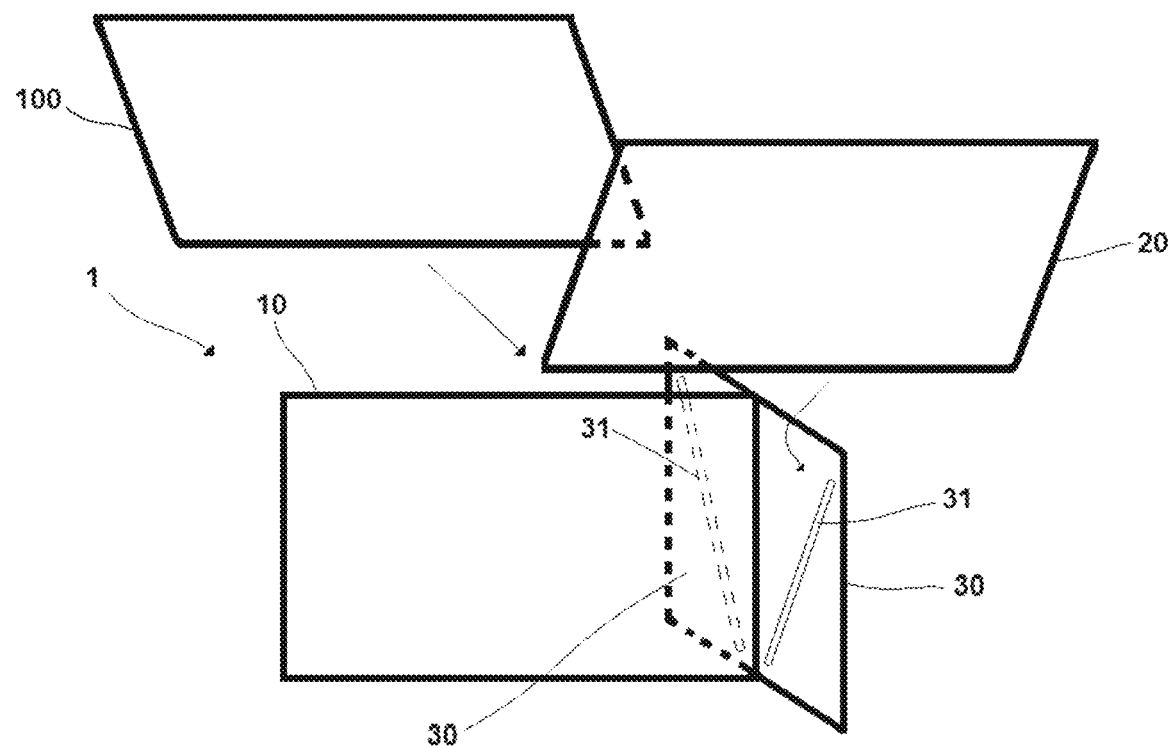
FIG. 16A is a perspective front view of the embodiment of the block of the present invention depicted in FIG. 15, whereby the front and rear walls are shown being placed onto inner ridges for support. Hidden edges are shown in ghost line.
Figure 16B:
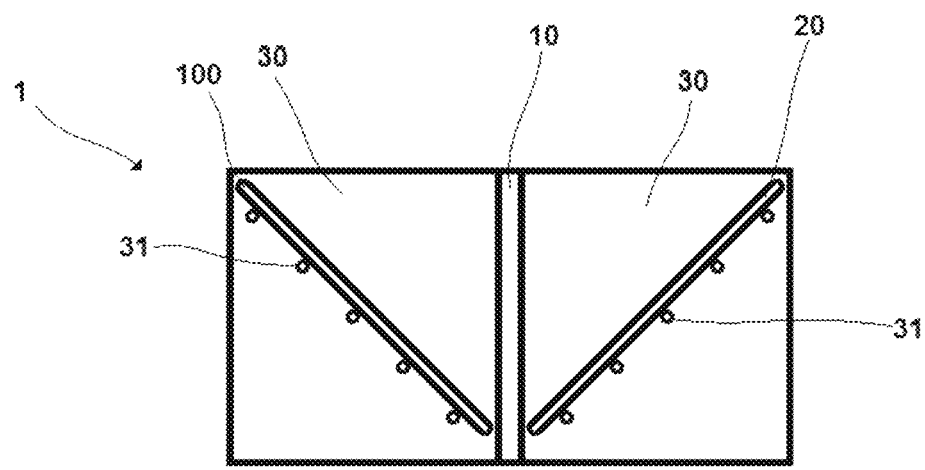
FIG. 16B is a plan side view of an embodiment of the block of the present invention depicted in FIG. 15, whereby the front and rear walls are shown placed onto pegs for support. Hidden edges are shown in ghost line.

In yet another variant of this embodiment of the block 1, the block 1 further comprises a rear wall 100. The rear wall 100 is configured the same as the front wall 20. In this variant, the first side wall 30 comprises a second diagonal inner protuberance 31 located on its inner surface between its central portion and its back edge. See FIG. 15. The second diagonal inner protuberance 31 is sized to accommodate the first side edge of the rear wall 100 thereupon, in the same manner as the front wall 20 is accommodated by the first diagonal inner protuberance. See FIGS. 16A and 16B. The second diagonal inner protuberance 31 may be configured as described above.

In yet another variant of this embodiment of the block 1, the first side wall 30 comprises a second diagonal outer protuberance 33 located on its outer surface between its central portion and its back edge. See FIG. 15. The second diagonal outer protuberance 33 is sized to accommodate the first side edge of the rear wall 100 thereupon, in the same manner as the front wall 20 is accommodated. The second diagonal outer protuberance 33 may be configured in the same manner as the second diagonal inner protuberance 31.

Figure 17:
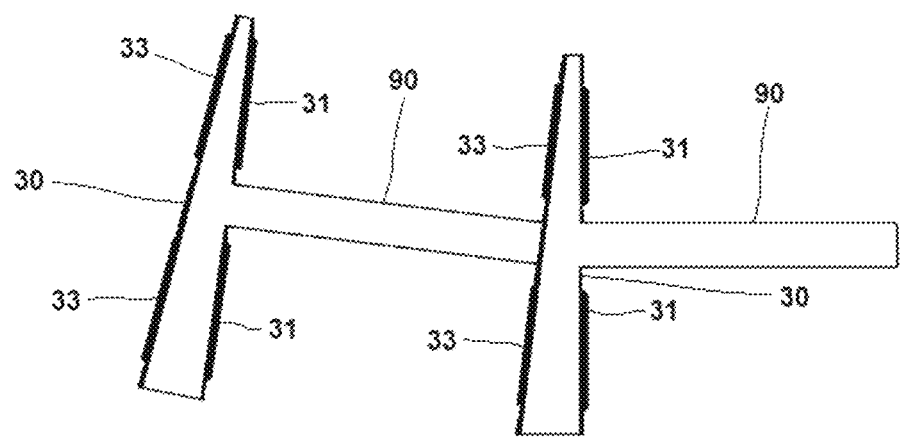
FIG. 17 is a top plan view of yet another embodiment of the block having a center wall adjacent to the first side wall, forming a "T" configuration, whereby the first side wall is tapered. Two such blocks are depicted adjacent to each other, to form a curved wall.

In yet another variant of this embodiment of the block 1, the first side wall 30 is tapered from its front edge to its back edge, such that the first side wall 30 is thicker at its front edge than at its back edge. See FIG. 17. Blocks 1 of his variant may be placed adjacent to each other, thereby producing a curved wall presenting as convex front with plantings. See FIG. 17.

When the block 1 is used as a planter, a waterproof coating may be applied to the block 1 within the block's 1 inner space 60. The waterproofing may be a liquid sealant that is applied to the inner surface of the interior space 60 of the block 1, or it can be a liner placed therein. The liner could be made of plastic or any other waterproof material. If the block 1 is intended to be installed below grade, waterproofing may be applied to the outer surface 70 of the block 1.

Modifications and variations can be made to the disclosed embodiments of the present invention without departing from the subject or spirit of the invention as defined in the following claims.

I claim:

1. A block comprising
a back wall, a front wall, and a first side wall,
wherein the back wall is substantially planar and substantially rectangular, having a bottom edge, a top edge, a first side edge, and a second side edge,
the front wall is substantially planar, having a bottom edge, a top edge, a first side edge, and a second side edge, and
the first side wall is substantially planar and substantially rectangular, having a bottom edge, a top edge, a back edge, and a front edge,
wherein the back wall is oriented substantially vertically,
the first side wall is oriented substantially vertically and substantially perpendicular to the back wall, wherein the back edge of the first side wall is located adjacent to the first side edge of the back wall, and
the front wall is oriented at an angle to the vertical, wherein the top edge of the front wall is substantially parallel to the top edge of the back wall and spaced apart from the top edge of the back wall, the bottom edge of the front wall is located proximate to the bottom edge of the back wall, and the first side edge of the front wall is located adjacent to the first side wall,
with each of the walls constructed of a durable, rigid material,
wherein the first side wall comprises a diagonal inner protuberance, said diagonal inner protuberance located on an inner surface of the first side wall, said diagonal inner protuberance sized to accommodate the first side edge of the front wall thereupon, and
the front wall is placed adjacent to the first side wall by placing the first side edge of the front wall onto the diagonal inner protuberance of the first side wall,
whereby the back wall, front wall, and first side wall form a three sided container with an open top and an interior space, and having a top perimeter formed of the top edges of the back wall, front wall, and first side wall, and a footprint parallel to and vertically aligned with the top perimeter.

2. A block comprising
a back wall, a front wall, and a first side wall,
wherein the back wall is substantially planar and substantially rectangular, having a bottom edge, a top edge, a first side edge, and a second side edge,
the front wall is substantially planar, having a bottom edge, a top edge, a first side edge, and a second side edge, and
the first side wall is substantially planar and substantially rectangular, having a bottom edge, a top edge, a back edge, and a front edge,
wherein the back wall is oriented substantially vertically,
the first side wall is oriented substantially vertically and substantially perpendicular to the back wall, wherein the back edge of the first side wall is located adjacent to the first side edge of the back wall, and
the front wall is oriented at an angle to the vertical, wherein the top edge of the front wall is substantially parallel to the top edge of the back wall and spaced apart from the top edge of the back wall, the bottom edge of the front wall is located proximate to the bottom edge of the back wall, and the first side edge of the front wall is located adjacent to the first side wall,
with each of the walls constructed of a durable, rigid material,
wherein the first side wall comprises a diagonal inner protuberance, said diagonal inner protuberance located on an inner surface of the first side wall, said diagonal inner protuberance sized to accommodate the first side edge of the front wall thereupon, and
the front wall is placed adjacent to the first side wall by placing the first side edge of the front wall onto the diagonal inner protuberance of the first side wall,
whereby the back wall, front wall, and first side wall form a three sided container with an open top and an interior space, and having a top perimeter formed of the top edges of the back wall, front wall, and first side wall, and a footprint parallel to and vertically aligned with the top perimeter;
said block further comprising
a second side wall,
wherein the second side wall is substantially planar and substantially rectangular, having a bottom edge, a top edge, a back edge, and a front edge,
the second side wall is oriented substantially vertically and substantially perpendicular to the back wall and substantially parallel to the first side wall and has substantially the same size and dimensions as the first side wall, wherein the back edge of the second side wall is located adjacent to the second side edge of the back wall, and
the second side edge of the front wall is located adjacent to the second side wall,
with the second side wall constructed of a durable, rigid material,
wherein the second side wall comprises a diagonal inner protuberance, said diagonal inner protuberance located on an inner surface of the second side wall, said diagonal inner protuberance sized to accommodate the second side edge of the front wall thereupon, and the front wall is placed adjacent to the second side wall by placing the second side edge of the front wall onto the diagonal inner protuberance of the second side wall, whereby the back wall, front wall, first side wall, and second side wall form a four sided container with an open top and an interior space, and having a top perimeter formed of the top edges of the back wall, front wall, first side wall, and second side wall and a footprint parallel to and vertically aligned with the top perimeter.

3. The block of claim 1 wherein the diagonal inner protuberance of the first side wall is comprised of a continuous raised ridge of substantially uniform height.

4. The block of claim 1 wherein the diagonal inner protuberance of the first side wall is comprised of a series of raised ridges of substantially uniform height, whereby the ridges are arranged linearly.

5. The block of claim 1 wherein the diagonal inner protuberance of the first side wall is comprised of a plurality of pegs, each peg having substantially the same height as each other peg, whereby the pegs are arranged linearly.

6. A block comprising
a back wall, a front wall, and a first side wall,
wherein the back wall is substantially planar and substantially rectangular, having a bottom edge, a top edge, a first side edge, and a second side edge,
the front wall is substantially planar, having a bottom edge, a top edge, a first side edge, and a second side edge, and
the first side wall is substantially planar and substantially rectangular, having a bottom edge, a top edge, a back edge, and a front edge,
wherein the back wall is oriented substantially vertically,
the first side wall is oriented substantially vertically and substantially perpendicular to the back wall, wherein the back edge of the first side wall is located adjacent to the first side edge of the back wall, and
the front wall is oriented at an angle to the vertical, wherein the top edge of the front wall is substantially parallel to the top edge of the back wall and spaced apart from the top edge of the back wall, the bottom edge of the front wall is located proximate to the bottom edge of the back wall, and the first side edge of the front wall is located adjacent to the first side wall,
with each of the walls constructed of a durable, rigid material,
wherein the first side wall comprises a diagonal inner protuberance, said diagonal inner protuberance located on an inner surface of the first side wall, said diagonal inner protuberance sized to accommodate the first side edge of the front wall thereupon,
the first side wall comprises a diagonal outer protuberance, said diagonal outer protuberance located on an outer surface of the first side wall, said diagonal outer protuberance oriented parallel to and aligned with the diagonal inner protuberance of the first side wall and sized to accommodate the second side edge of the front wall thereupon, and
the front wall is placed adjacent to the first side wall by placing the first side edge of the front wall onto the diagonal inner protuberance of the first side wall,
whereby the back wall, front wall, and first side wall form a three sided container with an open top and an interior space, and having a top perimeter formed of the top edges of the back wall, front wall, and first side wall, and a footprint parallel to and vertically aligned with the top perimeter.

7. The block of claim 6 wherein the diagonal outer protuberance of the first side wall is comprised of a continuous raised ridge of substantially uniform height.

8. The block of claim 6 wherein the diagonal outer protuberance of the first side wall is comprised of a series of raised ridges of substantially uniform height, whereby the ridges are arranged linearly.

9. The block of claim 6 wherein the diagonal outer protuberance of the first side wall is comprised of a plurality of pegs, each peg having substantially the same height as each other peg, whereby the pegs are arranged linearly.

10. The block of claim 2 wherein the diagonal inner protuberance of the second side wall is comprised of a continuous raised ridge of substantially uniform height.

11. The block of claim 2 wherein the diagonal inner protuberance of the second side wall is comprised of a series of raised ridges of substantially uniform height, whereby the ridges are arranged linearly.

12. The block of claim 2 wherein the diagonal inner protuberance of the second side wall is comprised of a plurality of pegs, each peg having substantially the same height as each other peg, whereby the pegs are arranged linearly.

13. The block of claim 1 wherein the second side edge of the back wall is beveled.

14. The block of claim 1 wherein an outer surface of the back wall is convex.

15. The block of claim 1 wherein an outer surface of the back wall is concave.

16. A block comprising
a center wall, a front wall, and a first side wall,
wherein the center wall is substantially planar and substantially rectangular, having a bottom edge, a top edge, a first side edge, and a second side edge,
the front wall is substantially planar and substantially rectangular, having a bottom edge, a top edge, a first side edge, and a second side edge, and
the first side wall is substantially planar and substantially rectangular, having a bottom edge, a top edge, a back edge, a front edge, and a central portion, with the central portion being located midway between the front edge and the back edge,
wherein the center wall is oriented substantially vertically,
the first side wall is oriented substantially vertically and substantially perpendicular to the center wall, wherein the first side edge of the center wall is located adjacent to the central portion of the first side wall, and
the front wall is oriented at an angle to the vertical, wherein the top edge of the front wall is substantially parallel to the top edge of the center wall and spaced apart from the top edge of the center wall, the bottom edge of the front wall is located proximate to the bottom edge of the center wall, and the first side edge of the front wall is located adjacent to the first side wall,
with each of the walls constructed of a durable, rigid material,
wherein the first side wall comprises a first diagonal inner protuberance, said first diagonal inner protuberance located on an inner surface of the first side wall between the central portion of the first side wall and the front edge of the first side wall, said first diagonal inner protuberance sized to accommodate the first side edge of the front wall thereupon, and
the front wall is placed adjacent to the first side wall by placing the first side edge of the front wall onto the first diagonal inner protuberance of the first side wall.

17. The block of claim 16 wherein the first side wall comprises a first diagonal outer protuberance, said first diagonal outer protuberance located on an outer surface of the first side wall between the central portion of the first side wall and the front edge of the first side wall, said first diagonal outer protuberance sized to accommodate the second side edge of the front wall thereupon.

18. The block of claim 16 further comprising
a rear wall, said rear wall being substantially planar and substantially rectangular, having a bottom edge, a top edge, a first side edge, and a second side edge, and
wherein the first side wall comprises a second diagonal inner protuberance, said second diagonal inner protuberance located on an inner surface of the first side wall between the central portion of the first side wall and the back edge of the first side wall, said second diagonal inner protuberance sized to accommodate the first side edge of the rear wall thereupon.

19. The block of claim 18 wherein
the first side wall comprises a first diagonal outer protuberance, said first diagonal outer protuberance located on an outer surface of the first side wall between the central portion of the first side wall and the front edge of the first side wall, said first diagonal outer protuberance sized to accommodate the second side edge of the front wall thereupon, and
the first side wall comprises a second diagonal outer protuberance, said second diagonal outer protuberance located on an outer surface of the first side wall between the central portion of the first side wall and the back edge of the first side wall, said second diagonal outer protuberance sized to accommodate the second side edge of the rear wall thereupon.

20. The block of claim 16 wherein the first diagonal inner protuberance of the first side wall is comprised of a continuous raised ridge of substantially uniform height.

21. The block of claim 16 wherein the first diagonal inner protuberance of the first side wall is comprised of a series of raised ridges of substantially uniform height, whereby the ridges are arranged linearly.

22. The block of claim 16 wherein the first diagonal inner protuberance of the first side wall is comprised of a plurality of pegs, each peg having substantially the same height as each other peg, whereby the pegs are arranged linearly.

23. The block of claim 17 wherein the first diagonal outer protuberance of the first side wall is comprised of a continuous raised ridge of substantially uniform height.

24. The block of claim 17 wherein the first diagonal outer protuberance of the first side wall is comprised of a series of raised ridges of substantially uniform height, whereby the ridges are arranged linearly.

25. The block of claim 17 wherein the first diagonal outer protuberance of the first side wall is comprised of a plurality of pegs, each peg having substantially the same height as each other peg, whereby the pegs are arranged linearly.

26. The block of claim 18 wherein the second diagonal inner protuberance of the first side wall is comprised of a continuous raised ridge of substantially uniform height.

27. The block of claim 18 wherein the second diagonal inner protuberance of the first side wall is comprised of a series of raised ridges of substantially uniform height, whereby the ridges are arranged linearly.

28. The block of claim 18 wherein the second diagonal inner protuberance of the first side wall is comprised of a plurality of pegs, each peg having substantially the same height as each other peg, whereby the pegs are arranged linearly.

29. The block of claim 19 wherein
the first diagonal outer protuberance of the first side wall is comprised of a continuous raised ridge of substantially uniform height, and
the second diagonal outer protuberance of the first side wall is comprised of a continuous raised ridge of substantially uniform height.

30. The block of claim 19 wherein
the first diagonal outer protuberance of the first side wall is comprised of a series of raised ridges of substantially uniform height, whereby the ridges are arranged linearly, and
the second diagonal outer protuberance of the first side wall is comprised of a series of raised ridges of substantially uniform height, whereby the ridges are arranged linearly.

31. The block of claim 19 wherein
the first diagonal outer protuberance of the first side wall is comprised of a plurality of pegs, each peg having substantially the same height as each other peg, whereby the pegs are arranged linearly, and
the second diagonal outer protuberance of the first side wall is comprised of a plurality of pegs, each peg having substantially the same height as each other peg, whereby the pegs are arranged linearly.

32. The block of claim 16 wherein the first side wall is tapered from its front edge to its back edge, such that the first side wall proximate to the front edge of the first side wall has a first thickness between the inner surface of the first side wall and an outer surface of the first side wall and the first side wall proximate to the back edge of the first side wall has a second thickness between the inner surface of the first side wall and the outer surface of the first side wall, with the first thickness being greater than the second thickness.

* * * * *